United States Patent [19]
Asai et al.

[11] Patent Number: 5,593,363
[45] Date of Patent: Jan. 14, 1997

[54] DRIVE LINE APPARATUS FOR AUTOMOTIVE VEHICLE

[75] Inventors: Jirou Asai, Okazaki; Yuichi Imani, Hamamatsu; Akira Ito, Oobu, all of Japan

[73] Assignee: Nippondenso Co., Ltd., Kariya, Japan

[21] Appl. No.: 557,327

[22] Filed: Nov. 14, 1995

[30]     Foreign Application Priority Data

Nov. 14, 1994  [JP]  Japan ................................. 6-278810
Jun. 12, 1995  [JP]  Japan ................................. 7-144450
Sep.  4, 1995  [JP]  Japan ................................. 7-226495

[51] Int. Cl.$^6$ ........................................................... B60K 17/06
[52] U.S. Cl. .................................................. 477/74; 477/71
[58] Field of Search ............................. 477/71, 73, 74; 192/13 R, 35

[56]         References Cited

U.S. PATENT DOCUMENTS 3,834,499   9/1974   Candellero et al. ................ 477/74
4,702,127  10/1987   Cote ..................................... 477/71
5,441,462   8/1995   Chan .................................... 477/74

FOREIGN PATENT DOCUMENTS 51-39348    4/1976   Japan .
60-12344    1/1985   Japan .
60-215429  10/1985   Japan .
61-160322   7/1986   Japan .
61-285142  12/1986   Japan .
62-26131    2/1987   Japan .
63-64950    4/1988   Japan .
63-53411   10/1988   Japan .
 329760    3/1991   Japan .
 380149    8/1991   Japan .
4203669    7/1992   Japan .

*Primary Examiner*—Dirk Wright
*Attorney, Agent, or Firm*—Cushman Darby & Cushman IP Group of Pillsbury Madison & Sutro LLP

[57]           ABSTRACT

A drive line device for an automotive vehicle is provided which includes a transmission and a clutch consisting of a flywheel connected to an engine and a clutch disc connected to an input shaft of the transmission. The drive line device includes a brake unit which applying a brake to a given peripheral portion of the flywheel so as to synchronize rotation of the input shaft of the transmission with rotation of an output shaft of the transmission when a gear shift is achieved.

13 Claims, 10 Drawing Sheets

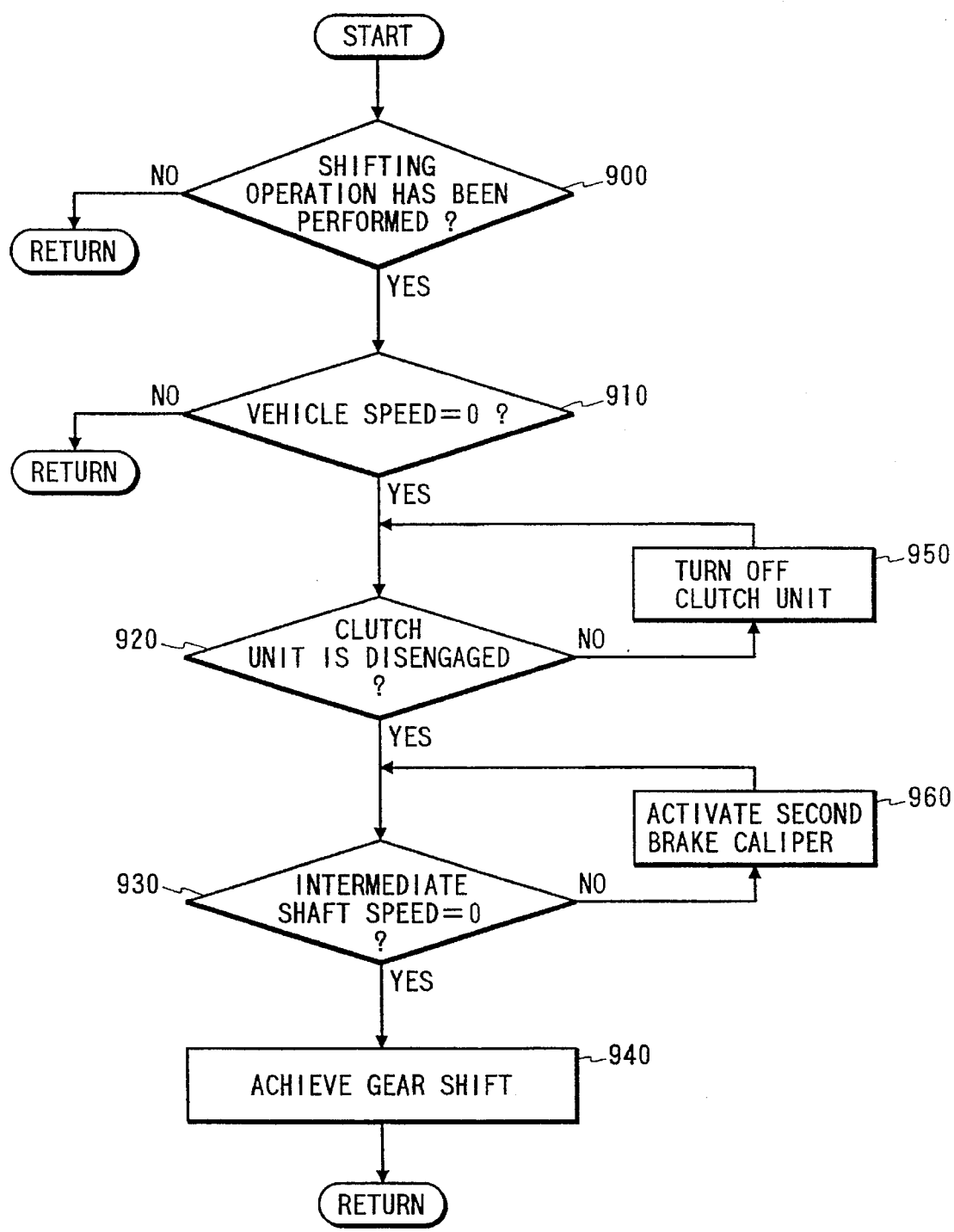

5,593,363

DRIVE LINE APPARATUS FOR AUTOMOTIVE VEHICLE

BACKGROUND OF THE INVENTION

1. Technical Field

The present invention relates generally to a drive line apparatus for automotive vehicles, and more particularly to a drive line apparatus including, for example, an automatic transmission device composed of a clutch and a parallel-shaft type gear transmission.

2. Background Art

A manual transmission device using a clutch and a parallel-shaft type gear transmission is well known in the art. This transmission device is inferior to an automatic transmission using a torque converter in ease of operation, but is superior in transmission efficiency of power and response rate.

Japanese Patent First Publication No. 60-215429 teaches an automatic transmission device having the advantages of the manual transmission device, as described above, which disconnects a power transmission line extending from an engine to an output shaft of a transmission when an upshift is made, returns a throttle valve to a fully-closed position with the aide of spring activity, and activates a starter motor as a generator to apply a load on the engine for establishing synchronization of the engine and the output shaft of the transmission, thereby shortening a shifting time.

The above conventional automatic transmission device, however, encounters the following drawback.

Since the power transmission line from the engine to the output shaft of the transmission is disconnected when the upshift is achieved, a load acting on the engine is decreased. Thus, even if an additional load is applied on the engine by controlling the throttle valve and the generator, the synchronization of the engine and the output shaft of the transmission is delayed, requiring an extended period of time for the shifting. Additionally, if the power transmission line from the engine to the output shaft of the transmission is engaged even though the engine is out of synchronization with the output shaft of the transmission for shortening the shifting time, it will cause large scale mechanical shock to be generated during the engagement of the power transmission line.

SUMMARY OF THE INVENTION

It is therefore a principal object of the present invention to avoid the disadvantages of the prior art.

It is another object of the present invention to provide a drive line apparatus for an automotive vehicle which is designed to achieve synchronization of an engine and an output shaft of a transmission quickly without generating an uncomfortable mechanical shock when a gear shift is made.

According to one aspect of the present invention, there is provided a drive line apparatus for an automotive vehicle which comprises: a transmission having an input shaft, an output shaft, an intermediate shaft, a transfer gear, a plurality of transmission gear sets having different gear ratios, respectively, the input shaft connecting with the intermediate shaft through the transfer gear, the output shaft selectively connecting with the intermediate shaft through engagement with a selected one of the transmission gear sets to establish a desired speed; a clutch unit for connecting a crankshaft of an engine and the input shaft of the transmission, the clutch unit including a flywheel connected to the crankshaft and a clutch disc connected to the input shaft of the transmission; a braking means for applying a brake force to a given peripheral portion of the flywheel of the clutch unit; a first speed determining means for determining a speed of the selected one of the transmission gear sets of the transmission; a second speed determining means for determining a speed of the output shaft of the transmission; and a controlling means for controlling operations of the clutch unit and the braking means, when a gear shift is performed to achieve the engagement with the selected one of the transmission gear sets to establish the desired speed of the output shaft, the controlling means bringing the clutch unit into a given degree of engagement and activating the braking means to modify the speed of the flywheel so as to establish synchronization of rotation of the selected one of the transmission gear sets with rotation of the output shaft based on the speeds determined by the first and second speed determining means.

In the preferred mode of the invention, the controlling means determines a synchronization speed of the selected one of the transmission gear sets and the output shaft based on the gear ratio of the selected one of the transmission gear sets and the speed of the output shaft determined by the second speed determining means, and controls the operation of the braking means based on a difference between the synchronization speed and the speed determined by the first speed determining means.

An intake air controlling means is further provided for controlling the amount of intake air introduced into the engine to modify speed of the engine when the gear shift is performed.

A second braking means is further provided for decreasing speed of the intermediate shaft of the transmission when the intermediate shaft rotates upon the gear shift.

The controlling means activates the second braking means to decrease the speed of the intermediate shaft to zero when a gear shift operation of the transmission is required while the vehicle is parked.

A disc is further provided which has formed thereon gear teeth engaging an engine starter mounted on the vehicle, and is attached to the flywheel of the clutch unit. The braking means applies the braking force to a given peripheral portion of the disc.

According to another aspect of the invention, there is provided a drive line apparatus for an automotive vehicle which comprises: a transmission having an input shaft, an output shaft, an intermediate shaft, a transfer gear, a plurality of transmission gear sets having different gear ratios, respectively, the input shaft connecting with the intermediate shaft through the transfer gear, the output shaft selectively connecting with the intermediate shaft through engagement with a selected one of the transmission gear sets to establish a desired speed; a clutch unit for connecting a crankshaft of an engine and the input shaft of the transmission, the clutch unit including a flywheel connected to the crankshaft and a clutch disc connected to the input shaft of the transmission; a braking means for applying a brake force to a given peripheral portion of the flywheel of the clutch unit; a first speed determining means for determining a speed of the crankshaft; a second speed determining means for determining a speed of the input shaft of the transmission; and a controlling means for controlling operations of the clutch unit and the braking means, when a gear shift is performed to achieve the engagement with the selected one of the transmission gear sets to establish the desired speed of the output shaft, the controlling means bringing the clutch unit into a given degree of engagement and activating the braking means to modify the speed of the flywheel so as to establish synchronization of rotation of the crankshaft with rotation of the input shaft of the transmission based on the speeds determined by the first and second speed determining means.

In the preferred mode of the invention, the controlling means determines a synchronization speed of the crankshaft and the input shaft of the transmission based on the gear ratio of the selected one of the transmission gear sets and the speed determined by the second speed determining means, and controls the operation of the braking means based on a difference between the synchronization speed and the speed determined by the first speed determining means.

The controlling means controls a degree of engagement of the clutch unit based on the difference between the synchronization speed and the speed determined by the first speed determining means.

An intake air controlling means is further provided for controlling the amount of intake air introduced into the engine to modify speed of the engine when the gear shift is performed.

A second braking means is further provided for decreasing speed of the intermediate shaft of the transmission when the intermediate shaft rotates upon the gear shift.

The controlling means activates the second braking means to decrease the speed of the intermediate shaft to zero when a gear shift operation of the transmission is required while the vehicle is parked.

A disc is further provided which has formed thereon gear teeth engaging an engine starter mounted on the vehicle, and is attached to the flywheel of the clutch unit. The braking means applies the braking force to a given peripheral portion of the disc.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 11 is a flowchart which shows an operation of the drive line apparatus shown in FIG. 10;

DESCRIPTION OF THE PREFERRED EMBODIMENT

Figure 1:
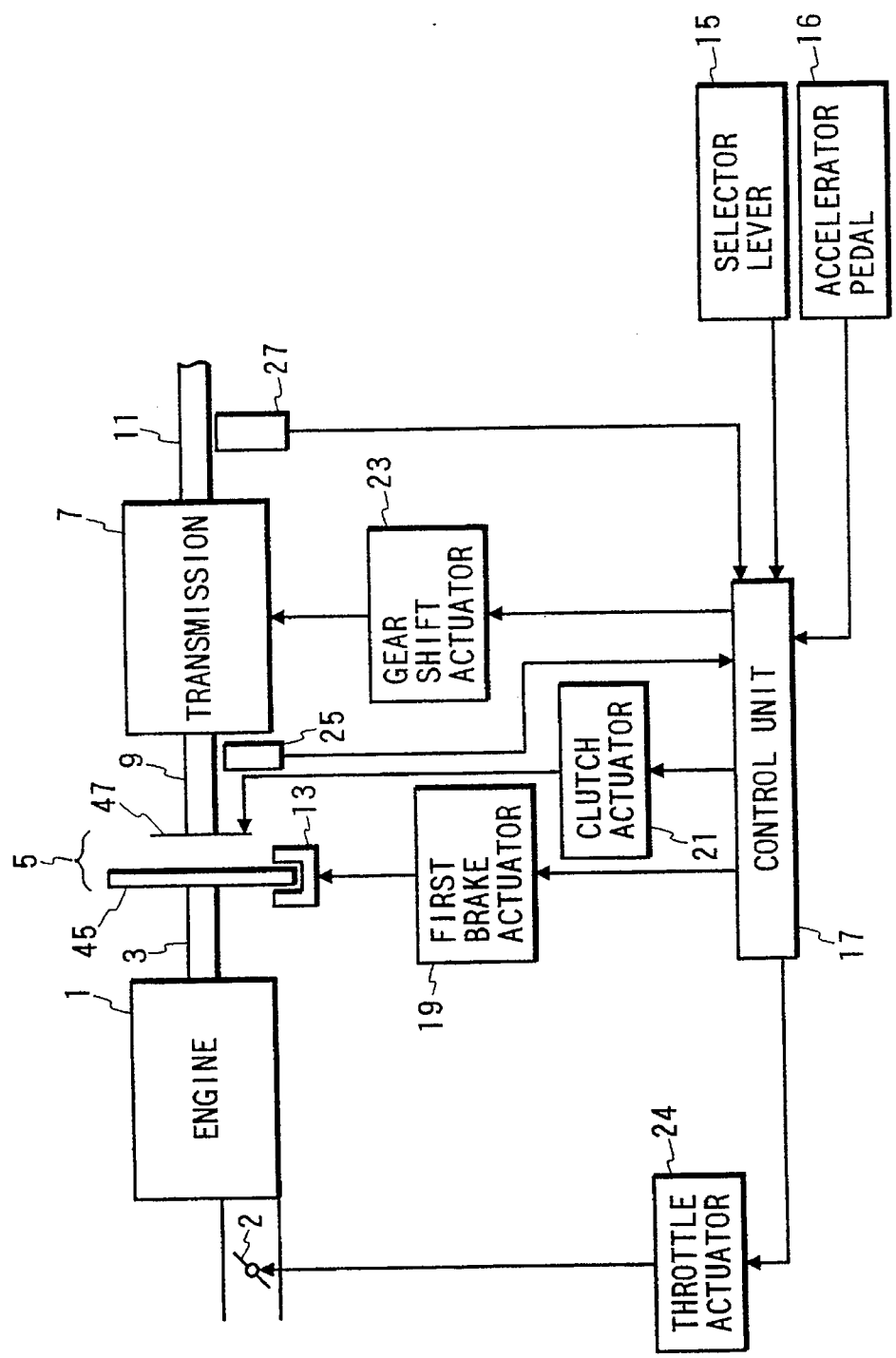
FIG. 1 is a block diagram which shows a drive line apparatus for an automotive vehicle according to the present invention.

Referring now to the drawings, particularly to FIG. 1, there is shown a drive line apparatus for an automotive vehicle according to the present invention which generally includes a clutch unit 5 connecting with an end of a crankshaft 3, an input shaft 9 connecting with the clutch unit 5 to transmit engine power from an engine 1 to a transmission 7, a drive shaft 11 transmitting the output power from the transmission 7 to a differential gear (not shown), a first brake caliper 13 for restricting rotation of the crankshaft 3, an input shaft speed sensor 25 for measuring a rotational speed of the input shaft 9, and a drive shaft speed sensor 27 for measuring a rotational speed of the drive shaft 11.

The drive line apparatus further includes a control unit 17 which receives sensor signals outputted from the input shaft speed sensor 25 and the drive shaft speed sensor 27, a gear shift signal from a selector lever 15 which commands a gear shift to, for example, a D range, an R rage, or a 1st speed, and a throttle opening angle signal from an accelerator pedal 16 to control the first brake caliper 13, the clutch unit 5, the transmission 7, and a throttle valve 2.

The first brake caliper 13, the clutch unit 5, the transmission 7, and the throttle valve 2 are operated under hydraulic pressures controlled by a first brake actuator 19, a clutch actuator 21, a gear shift actuator 23, and a throttle actuator 24, respectively, according to control signals outputted from the control unit 17.

The clutch unit 5 includes a flywheel 45 connected to the end of the crankshaft 3 and a clutch disc 47 connected to the end of the input shaft 9 so as to selectively establish engagement with and disengagement from the flywheel 45.

Figure 5:
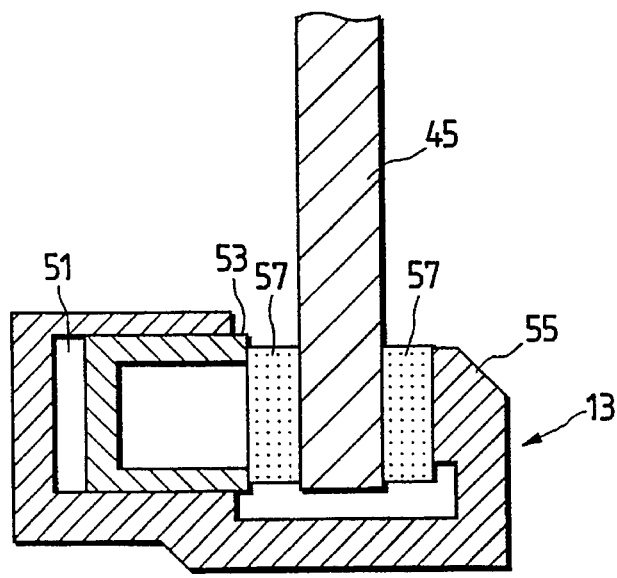
FIG. 5 is a cross sectional view which shows a brake caliper and a flywheel.

The first brake caliper 13, as shown in FIG. 5, includes a cylindrical chamber 51, first and second pistons 53 and 55, and a brake pad 57. The cylindrical chamber 51 is supplied with hydraulic pressure through a hydraulic port (not shown) by the activity of the first brake actuator 19 in FIG. 1. The increase in hydraulic pressure in the cylindrical chamber 51 causes the first and second pistons 53 and 55 to move in the right direction, as viewed in the drawing, so that the brake pad 57 holds a peripheral portion of the flywheel 45 tightly to reduce the speed of the crankshaft 3.

Figure 2:
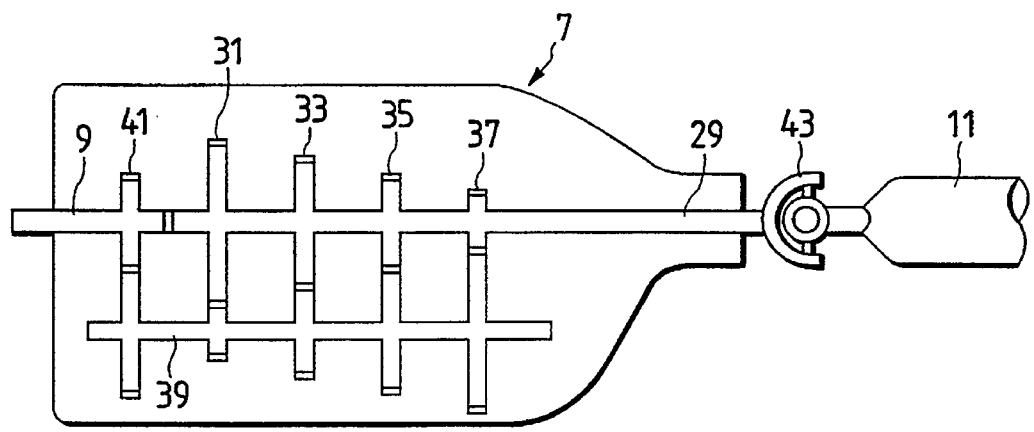
FIG. 2 is a schematic illustration which shows an internal structure of a transmission.

The transmission 7 is, as shown in FIG. 2, of a conventional type including a main shaft (i.e., an output shaft) 29 connected to the drive shah 11, an intermediate shaft (also called a counter shaft) 39 connected to a plurality of transmission gear sets 31 to 37 having different gear ratios, respectively, and the input shaft 9 connected to the intermediate shaft 39 through a transfer gear 41. The main shaft 29 is connected to the drive shaft 11 through a universal joint 43. The main shaft 29 and the drive shaft 11 rotate together in synchronism with each other. The main shah 29 is controlled by the gear shift actuator 23 so as to engage a selected one of the transmission gear sets 31 to 37 in synchronization with each other through a synchromesh (not shown). These arrangements and operation are well known in the art, and explanation thereof in detail will be omitted here.

Figure 3:
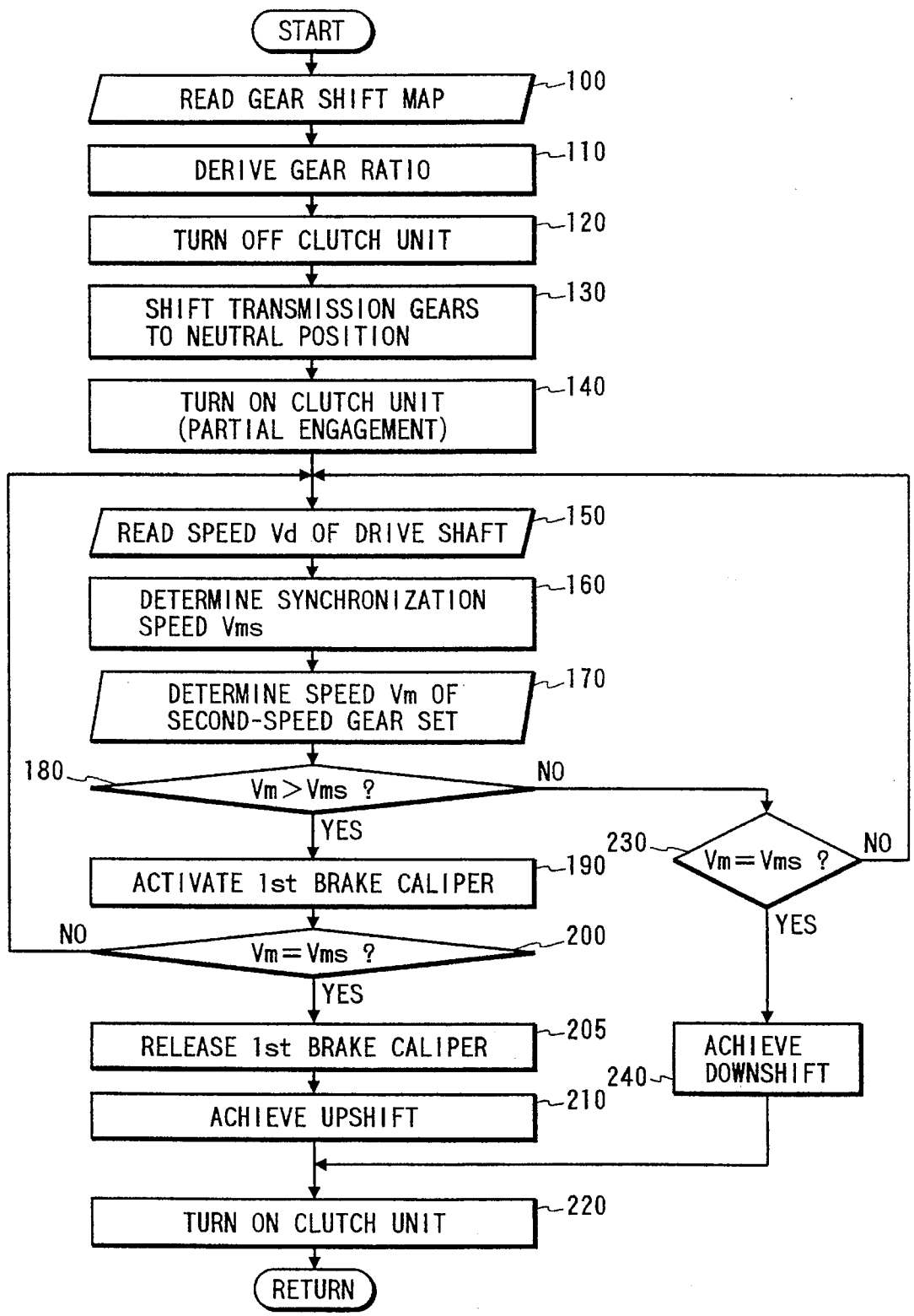
FIG. 3 is a flowchart which shows an operation of a drive line apparatus according to the first embodiment.

FIG. 3 shows a flowchart of a program or sequence of logical steps performed by the control unit 17 of the drive line apparatus of the invention based on inputs from the input shaft speed sensor 25, the drive shaft speed sensor 27 in FIG. 1, and the accelerator pedal 16.

Figure 4:
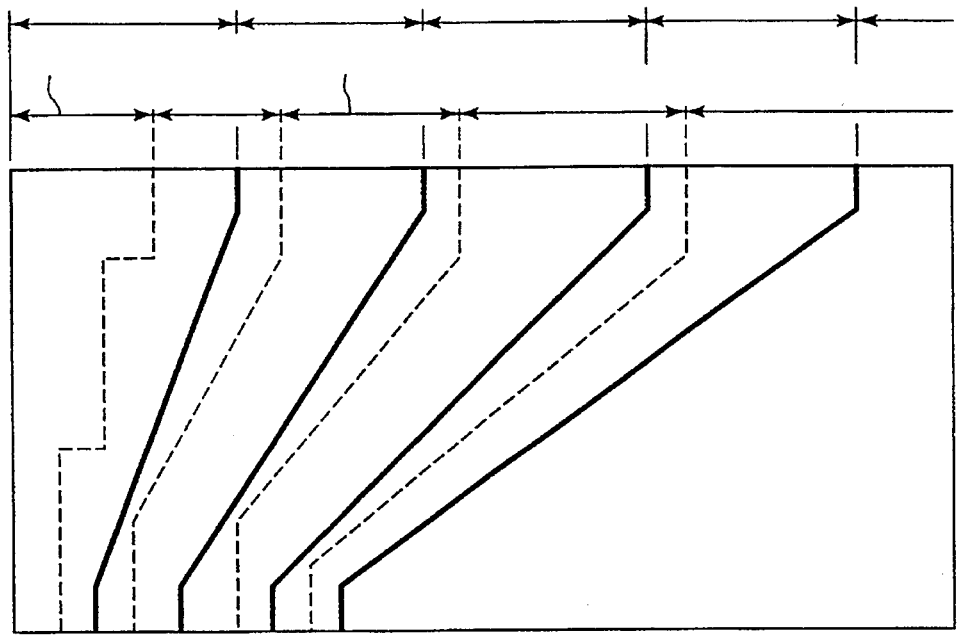
FIG. 4 is a gear shift map which represents a shifting schedule of a transmission.

When the selector lever 15 is shifted to, for example, the D range to start the vehicle, the main shaft 29 is brought into engagement with the first-speed gear set 31 having a low-speed gear ratio of the transmission 7, and then the clutch actuator 21 is activated gradually to connect the crankshaft 3 and the input shaft 9 through the clutch unit 5, so that the engine power is transmitted to the drive shaft 11 through the crankshaft 3, the input shaft 9, the intermediate shaft 39, and the main shaft 29. In the following discussion, it is assumed that when it is required to perform an upshift during acceleration of the vehicle, a gear change is achieved from the first-speed gear set 31 to the second-speed gear set 33, while when it is required to perform a downshift during deceleration of the vehicle, a gear change is achieved from a higher-speed gear set to the second-sped gear set 33. The shift timing is determined by look-up using a gear shift map, as shown in FIG. 4, stored in the control unit 17, representing a shifting schedule in relation to an angular position or opening degree of the throttle valve 2 and a vehicle speed (i.e., speed of the drive shaft 11).

After entering the program, the routine proceeds to step 100 wherein the gear shit map is read to derive shifting information based on the opening degree of the throttle valve 2 and the speed of the drive shaft 11. The routine then proceeds to step 110 wherein a desired gear ratio is determined based on the shifting information read out of the gear shit map. The routine then proceeds to step 120 wherein the clutch actuator 21 is turned off to bring the clutch unit 5 into disengagement to block the transmission of the engine power to the transmission 7. This causes a load on the engine 1 to disappear, so that the crankshaft 3 is placed out of synchronization with a power transmission line extending from the input shaft 9 to the main shaft 29 through the intermediate shaft 39 that engage with each other, and its speed is increased to create a difference in speed between the crankshaft 3 and the power transmission line.

Subsequently, the routine proceeds to step 130 wherein the transmission gear sets 31 to 37 are brought into a neutral position wherein the input shaft 9, the transfer gear 41, the intermediate shaft 39, and the transmission gear sets 31 to 37 are connected to each other, while the transmission gear sets 31 to 37 and the main shaft 29 are out of engagement. Since the clutch unit 5 is, as mentioned above, out of engagement, the engine power is not transmitted to the input shaft 9, the intermediate shaft 39, and the main shaft 29.

The power transmission line from the input shaft to the transmission gear sets 31 to 37 through the transfer gear 41 and the intermediate shaft 39 remains rotating at the same speed as that before the transmission gears 31 to 37 are placed in the neutral position, thereby causing the main shaft 29 and the second-speed gear 33 to be out of synchronization with each other upon shifting to the second-speed gear 33, so that a difference in speed therebetween occurs.

The difference in speed between the main shaft 29 and the second-speed gear 33 is, as will be described below in detail, eliminated by bringing the clutch unit 5 into partial engagement allowing a given degree of slippage, and activating the first brake caliper 13 to bring the speed of the second-speed gear 33 into conformity with that of the main shaft 29.

First, in step 140, the clutch actuator 21 is controlled to bring the clutch unit 5 into the partial engagement. The routine then proceeds to step 150 wherein a speed Vd of the drive shah 11 is read from the drive shaft speed sensor 27. The routine then proceeds to step 160 wherein a synchronization speed Vms of the second-speed gear 33 and the main shaft 29 after the upshift to the second-speed gear 33 is achieved is mathematically projected. The routine then proceeds to step 170 wherein a speed of the input shaft 9 is read from the input shaft speed sensor 25 to determine a speed Vm of the second-speed gear set 33.

The speed Vd of the drive shaft 11 derived in step 150 is used instead of a speed of the main shaft 29 for synchronizing the second-speed gear 33 with the main shaft 29. This is because the drive shaft 11 and the main shaft 29, as described above, rotate together at the same speed. Of course, the speed of the main shaft 29 may alternatively be measured directly using another speed sensor in step 150. Similarly, the speed of the input shaft read out of the input shaft speed sensor 25 is used to determine the speed Vm of the second-speed gear set 33 in step 170 for synchronizing the second-speed gear set 33 with the main shaft 29. This is because when the transmission gear sets 31 to 37 are placed in the neutral position in step 130, the power transmission line from the input shaft 9 to the transmission gears 31 to 37 through the transfer gear 41 and the intermediate shaft 39 is in engagement, so that the speed Vm of the second-speed gear set 33 can be derived based on the speed of the input gear shaft taking gear ratios of the transfer gear 41 and the second-speed gear set 33 into account. Thus, the speed of the transfer gear 41, the intermediate gear 39, or the transmission gear sets 31 to 37 may alternatively be measured directly in step 170 to determine the speed Vm.

The synchronization speed Vms of the second-speed gear set 33 and the main shaft 29 to be determined in step 160 may be found based on the speed Vd of the drive shaft 11 and the gear ratio of the second-speed gear 8 derived in step 110.

After step 170, the routine proceeds to step 180 wherein it is determined whether the speed Vm is greater than the synchronization speed Vms or not. If a YES answer is obtained (Vm >Vms), it is concluded that an upshift have been selected, and then the routine proceeds to step 190 wherein the first brake caliper 13 is turned on to decrease the speed of the crankshaft 3.

The routine then proceeds to step 200 wherein it is determined whether the speed Vm is decreased to agree with the synchronization speed Vms or not. If a NO answer is obtained, then the routine returns back to step 150 wherein the speed Vd of the drive shaft 11 is determined again. Alternatively, if a YES answer is obtained, then the routine proceeds to step 205 wherein the first brake caliper 13 is turned off. The routine then proceeds to step 210 wherein the main shaft 29 is brought into engagement with the second-speed gear set 33 using the synchromesh. The routine then proceeds to step 220 wherein the clutch unit 5 which is controlled to be in the partial engagement in step 140 is brought into complete or tight engagement.

The same processing of the program as discussed above is also performed when a gear shift to the third- or fourth-speed gear set 35 or 37 is achieved.

The operation of the drive line apparatus when a downshift is achieved will be discussed below which is different from the upshift operation only in steps following step 1).

If a NO answer is obtained in step 180 meaning that the speed Vm of the second-speed gear set 33 is smaller than the synchronization speed Vms, it is concluded that a downshift has been selected, and then the routine proceeds to step 230 wherein it is determined whether the speed Vm is equal to the synchronization speed Vms or not. If a NO answer is obtained, then the routine returns back to step 150. Alternatively, if a YES answer is obtained, then the routine proceeds to step 240 wherein the main shaft 29 is brought into engagement with a lower-speed gear set selected in step 110 through the synchronizer. The routine then proceeds to step 220 wherein the clutch unit 5 is engaged fully.

As apparent from the above discussion, when a downshift is performed, the main shaft 29 is held from engaging the selected lower-speed gear set until the speed Vm is increased to agree with the synchronization speed Vms, after which the clutch unit 5 is brought into tight engagement.

According to the above first embodiment, the first brake caliper 13 applies a frictional brake force near the peripheral portion of the flywheel 45 of the clutch unit 5, so that synchronizations between speeds of the input and output shafts of the clutch unit 5 and between speeds of the parallel-arranged shafts of the transmission 7 (i.e., the intermediate shaft 39 and the main shaft 29) are established at high speed. In general, most of inertia force is concentrated on the flywheel 45, especially, on the peripheral portion of the flywheel 45. A great brake force is thus derived by applying a frictional force to the peripheral portion of the flywheel 45.

Tests were performed using a six-cylinder engine having 2500 cc displacement to decrease engine speed from 6000 rpm to 0 rpm to measure a braking time for every reduction in speed of 1000 rpm. The test results show that when the engine speed is decreased by closing the throttle valve 2 and cutting fuel supply to the engine, a braking time of 600 msec. is required for reduction in speed of 1000 rpm, while when a control pressure of 80 kgf/cm$^2$ is applied to the first brake caliper 13 to hold the flywheel 45, a braking time of only 70 msec. is required for reduction in speed of 1000 rpm.

The use of the first Brake caliper 13 eliminates the need for changing fuel control through the throttle valve 2 even when an upshift is achieved. The engine power is thus maintained without being decreased.

In steps 200 and 230, the determination is made as to whether the speed Vm is equal to the synchronization speed Vms or not, however, it is not necessary for the speed Vm to agree with the synchronization speed Vms correctly. An allowable rage not affecting shift quality may be provided. Additionally, the clutch unit 5 is controlled to be in the partial engagement in step 140, however, it may be placed in the tight engagement if a load on the engine 1 is low.

Figure 6:
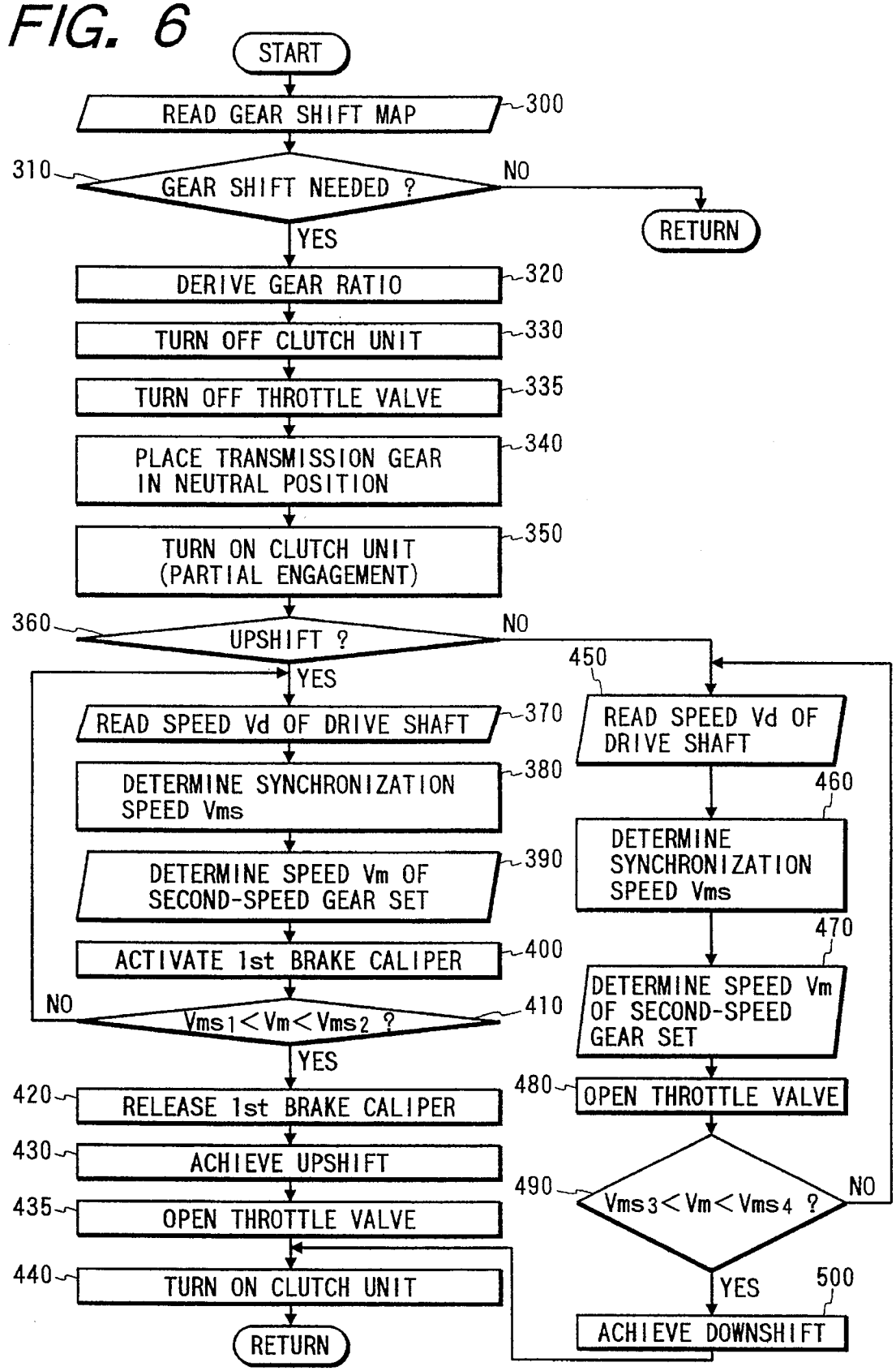
FIG. 6 is a flowchart which shows an operation of a drive line apparatus according to the second embodiment.

FIG. 6 shows the second embodiment of the invention which controls the amount of air supplied to the engine 1 through the throttle valve 2 in addition to controlling the speed of the engine 1 through the first brake caliper 13 when an upshift is performed.

After entering the program, the routine proceeds to step 300 wherein the gear shift map is read to derive shifting information. The routine then proceeds to step 310 wherein it is determined whether a gear shift is needed or not. If a NO answer is obtained, the routine returns back to step 300. Alternatively, if a YES answer is obtained, then the routine proceeds to step 320 wherein a desired gear ratio is determined to select one of the transmission gear sets 31 to 37 based on the shifting information read out of the gear shift map in step 300. The routine then proceeds to step 330 wherein the clutch actuator 21 is turned off to release the engagement of the clutch unit 5, holding the engine power from being transmitted to the transmission 7. The routine then proceeds to step 335 wherein the throttle actuator 24 is activated to close the throttle valve 2 so that the engine 1 undergoes a fuel cut to reduce engine speed.

The routine then proceeds to step 340 wherein the transmission gears 31 to 37 are placed in the neutral position. The routine then proceeds to step 350 wherein the clutch unit 5 is placed in the partial engagement. The routine then proceeds to step 360 wherein it is determined whether an upshift should be made or not. If a YES answer is obtained meaning that the upshift should be made, then the routine proceeds to step 370 wherein the speed Vd of the drive shaft 11 is determined. The routine then proceeds to step 380 wherein the synchronization speed Vms at which the speed of the selected transmission gear set in step 320 is synchronized with the speed of the main shaft 29 after a gear shift is achieved is determined. The routine then proceeds to step 390 wherein the speed of the input shaft 9 is read to determine the speed Vm in the same manner as in step 170 of FIG. 3.

Subsequently, the routine proceeds to step 400 wherein the first brake caliper 13 is activated to control the speed of the crankshaft 3 or the speed of the engine 1. The routine then proceeds to step 410 wherein it is determined whether or not the speed Vm falls between a lower limit Vms1 and an upper limit Vms2 of a synchronization speed range defined based on the synchronization speed Vms derived in step 380. If a NO answer is obtained meaning that the speed Vm is out of the synchronization range, then the routine returns back to step 370. Alternatively, if a YES answer is obtained meaning that the speed Vm is in the synchronization speed range, then the routine proceeds to step 420 wherein the first brake caliper 13 is turned off. The routine then proceeds to step 430 wherein the upshift is achieved. The routine then proceeds to step 435 wherein the throttle actuator 24 is activated to open the throttle valve 2. The routine then proceeds to step 440 wherein the clutch unit 5 is controlled to be brought into the tight engagement.

When the downshift is performed, in other words, if a NO answer is obtained in step 360, then the routine proceeds to step 450 wherein the speed Vd of the drive shaft 11 is read. The routine then proceeds to step 460 wherein the synchronization speed Vms is determined. The routine then proceeds to step 470 wherein the speed Vm is determined. The routine then proceeds to step 480 wherein the throttle actuator is activated to open the throttle valve 2 to increase the speed of the engine 1 for synchronizing the speed of the transmission gear set selected in step 320 with that of the main shaft 29.

The routine then proceeds to step 490 wherein it is determined whether or not the speed Vm falls between a lower limit Vms3 and an upper limit Vms4 of a synchronization speed rage determined based on the synchronization speed Vms derived in step 460. If a NO answer is obtained meaning that the speed Vm lies out of the synchronization range, then the routine returns back to step 450. Alternatively, if a YES answer is obtained meaning that the speed Vm is in the synchronization speed rage, then the routine proceeds to step 500 wherein the downshift is achieved, after which the routine proceeds to step 440.

According to the above operation of the second embodiment, when the upshift is made, the amount of air supplied to the engine 1 is controlled through the throttle valve 2 and the speed of the engine 1 is also controlled through the first brake caliper 13, so that the synchronizations between speeds of the input and output shafts of the clutch unit 5 and between speeds of the parallel-arranged shafts of the transmission 7 are established quickly. When the downshift is made, the throttle valve 2 is opened to increase the engine speed, so that the synchronizations between speeds of the input and output shafts of the clutch unit 5 and between speeds of the parallel-arranged shafts of the transmission 7 are also established quickly.

Figure 13:
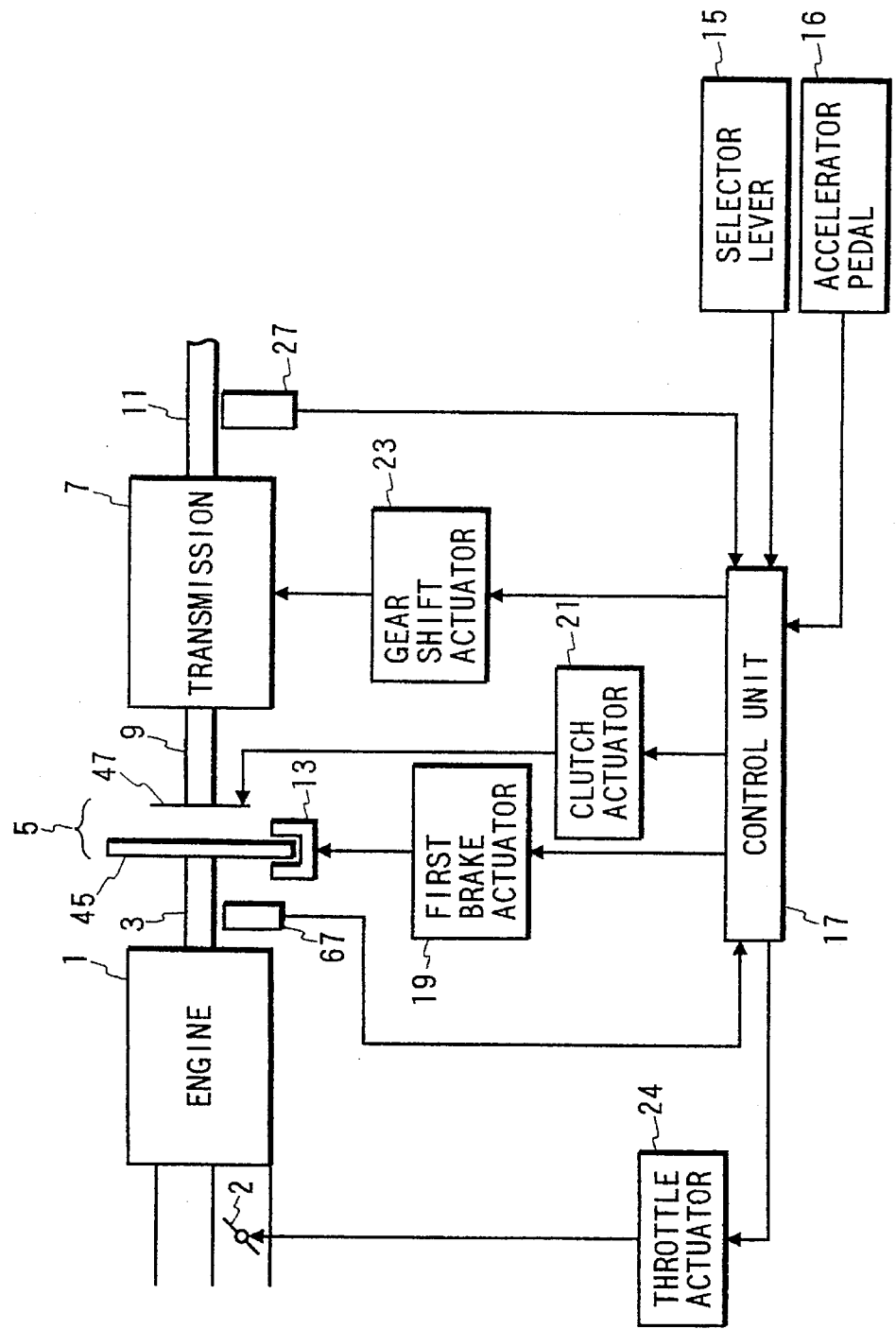
FIG. 13 is a block diagram which shows a drive line apparatus according to the third embodiment.

FIG. 13 shows a drive line apparatus of the third embodiment which is different from the first and second embodiments in that a crankshaft speed sensor 67 measuring the speed of the crankshaft 3 is provided instead of the input shaft speed sensor 25. Other arrangements are identical, and explanation thereof in detail will be omitted here.

Figure 7:
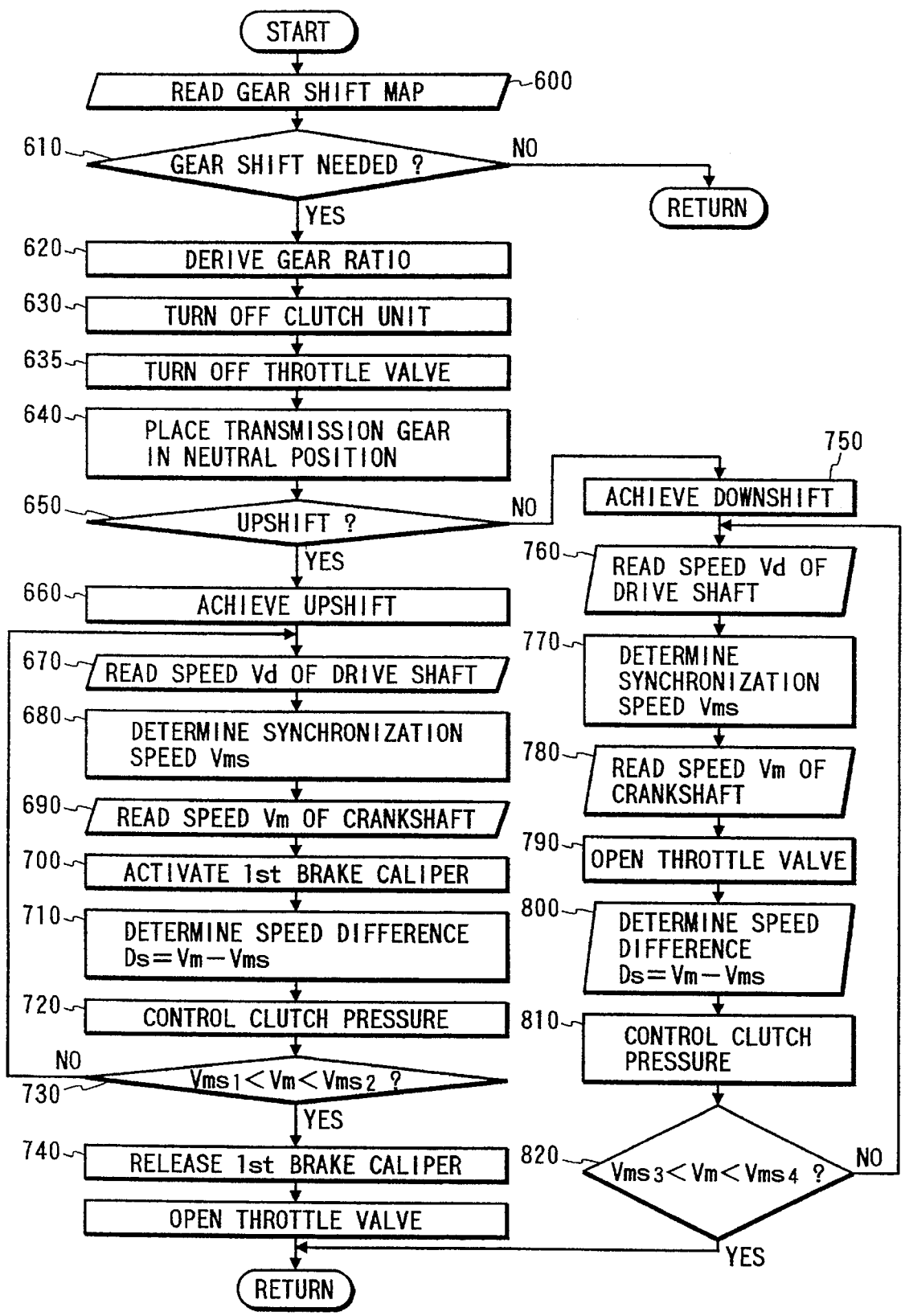
FIG. 7 is a flowchart which shows an operation of a drive line apparatus according to the third embodiment.

FIG. 7 shows a flowchart of a program performed by the drive line of the third embodiment. Steps 600 to 640 are the same as steps 300 to 340 in the second embodiment of FIG. 6, and explanation thereof will be omitted here.

After step 640, the routine proceeds to step 650 wherein it is determined whether an upshift should be made or not. If a YES answer is obtained, then the routine proceeds to step 660 wherein the gear shift actuator 23 is activated to bring the intermediate shaft 39 and the main shaft 29 into engagement for achieving the upshift to the gear ratio selected in step 620. The synchronization of the intermediate shaft 39 and the main shaft 29 is established by the synchromesh. The routine then proceeds to step 670 wherein the speed Vd of the drive shaft 11 is read. The routine then proceeds to step 680 wherein the synchronization speed Vms of the crankshaft 3 and the input shaft 9 is determined based on the gear ratio determined in step 620 and the speed of the input shaft 9.

The speed Vd of the drive shaft 11 is determined through the drive shaft speed sensor 27 in step 670 for establishing the synchronization of the crankshaft 3 and the input shaft 9, that is, synchronization of the flywheel 45 and the clutch disc 47. This is because the speed of the drive shaft 11 is identical with that of the input shaft 9 since main shaft 29 is brought into engagement with the intermediate shaft 39 in step 660, so that the power transmission line from the input shaft 9 to the main shaft 29 is in gear. Therefore, in step 670, the speed of the input shaft 9, the transfer gear 41, the intermediate shaft 39, the transmission gear sets 31 to 37, or the main shaft 28 may alternatively be measured.

Figure 8:
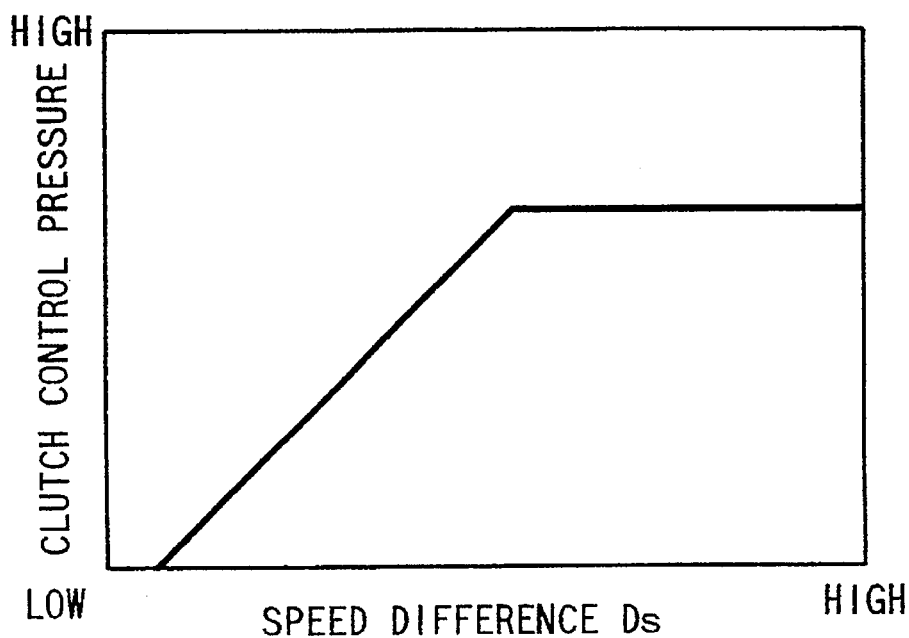
FIG. 8 is a graph which shows the relation between a controlled pressure applied to a clutch unit and a difference between a crankshaft speed and a synchronization speed.
Figure 9:
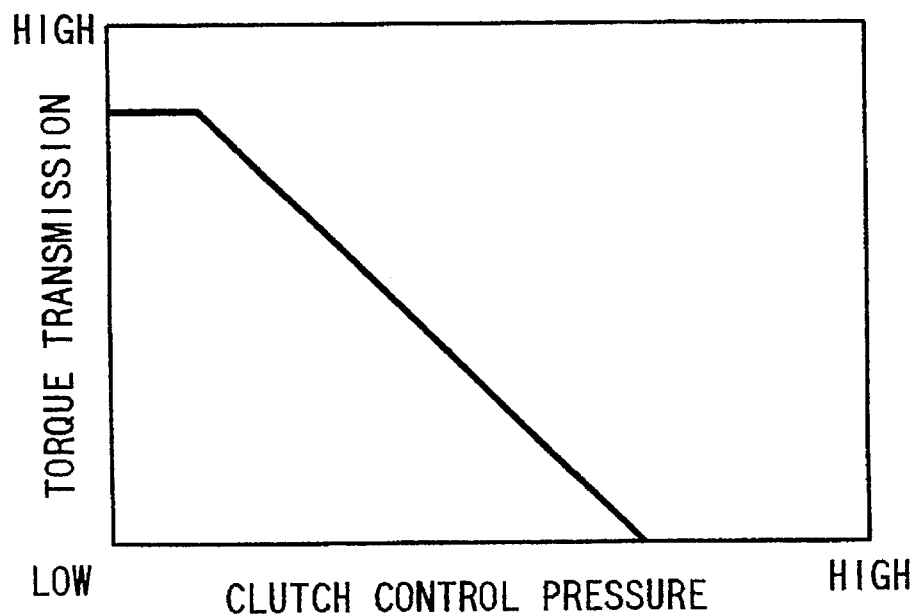
FIG. 9 is a graph which shows the relation between a controlled pressure applied to a clutch unit and the mount of torque transmitted to an input shaft of a transmission.

After step 690, the routine proceeds to step 690 wherein a speed Vm of the crankshaft 3 is determined through the crankshaft speed sensor 67. The routine then proceeds to step 700 wherein the first brake caliper 13 is activated to control the speed of the crankshaft 3 or the speed of the engine 1. The routine then proceeds to step 710 wherein a difference Ds between the speed Vm of the crankshaft 3 and the synchronization speed Vms is determined. The routine then proceeds to step 720 wherein the clutch actuator 21 is controlled to modify the hydraulic pressure applied to the clutch unit 5 according to the relation shown in FIG. 8 for controlling the transmission of torque through the clutch unit 5. Specifically, when the speed difference Ds is greater then a given value, a constant greater hydraulic pressure is applied to the clutch unit 5, while as the speed difference Ds is decreased, the hydraulic pressure applied to the clutch unit 5 is decreased gradually. The gradual decrease in hydraulic pressure applied to the clutch unit 5 causes, as shown in FIG. 9, the amount of torque transmitted to the input shaft 9 to be increased slowly, thereby reducing a mechanical shock generated during a gear shift. based on.

Subsequently, the routine proceeds to step 730 wherein it is determined whether or not the speed Vm of the crankshaft 3 derived in step 690 falls between a lower limit Vms1 and an upper limit Vms2 of a synchronization speed range determined based on the synchronization speed Vms derived in step 680. If a NO answer is obtained meaning that the speed Vm lies out of the synchronization range, then the routine returns back to step 670. Alternatively, if a YES answer is obtained meaning that the speed Vm is in the synchronization speed rage, then the routine proceeds to step 740 wherein the first brake caliper 13 is turned off. The routine then proceeds to step 745 wherein the throttle valve 2 is opened.

If a NO answer is obtained in step 650 meaning that a downshift should be made, then the routine proceeds to step 750 wherein the downshift is achieved by establishing synchronization of the intermediate shaft 39 and the main shaft 29 through the synchromesh. Subsequently, the same steps 760 to 780 as steps 670 to 690 are performed.

After step 780, the routine proceeds to step 790 wherein the throttle actuator 24 is activated to open the throttle valve 2 to increase the speed of the engine 1 for establishing synchronization of the selected transmission gear and the main shaft 29 at high speed.

The routine then proceeds to step 800 wherein a difference Ds between the speed Vm of the crankshaft 3 and the synchronization speed Vms is determined. The routine then proceeds to step 810 wherein the hydraulic pressure applied to the clutch unit 5 is controlled based on the speed difference Ds derived in step 810 in a similar manner to step 720. The routine then proceeds to step 810 wherein it is determined whether or not the speed Vm of the crankshaft 3 derived in step 780 falls between a lower limit Vms3 and an upper limit Vms4 of a synchronization speed range determined based on the synchronization speed Vms derived in step 770. If a NO answer is obtained meaning that the speed Vm is out of the synchronization range, then the routine returns back to step 760. Alternatively, if a YES answer is obtained meaning that the speed Vm is in the synchronization speed range, then the routine proceeds to step 740 wherein the first brake caliper 13 is turned off. The routine then returns back to the initial step.

Figure 10:
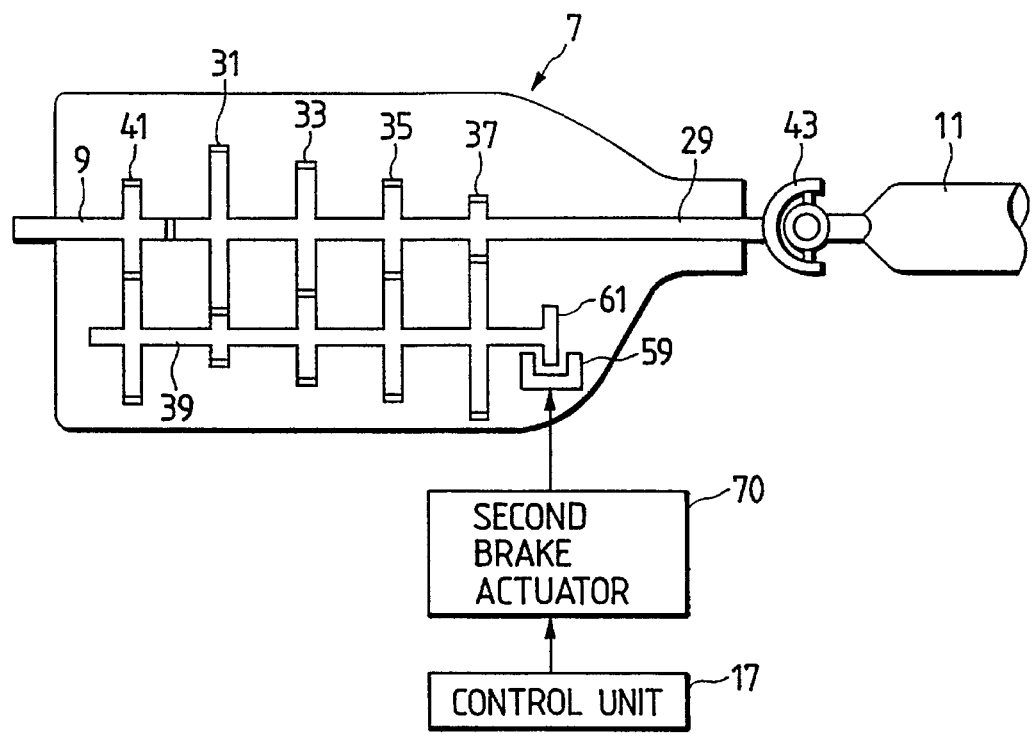
FIG. 10 is a schematic illustration which shows a modification of a drive line apparatus including a second brake caliper applying a brake on an intermediate shaft of a transmission.

FIG. 10 shows a modification of the drive line apparatus of the invention which is different in structure from the above embodiments only in that a second brake caliper 59 is provided which is controlled by a second brake actuator 70 to hold a brake disc 61 attached to an end of the intermediate shaft 39 for reducing the speed of the intermediate shaft 39. Other arrangements are identical.

In addition, a program or logical steps shown in FIG. 11 are performed prior to step 100, 300, or 600 in FIG. 3, 6, or 7.

After entering the program, the routine proceeds to step 900 wherein it is determined whether a shifting operation (e.g., from N rage to D range) has been done through the selector lever 15 or not. If a NO answer is obtained, then the routine repeats step 900. Alternatively, if a YES answer is obtained, then the routine proceeds to step 910 wherein it is determined whether vehicle speed derived from a speedometer, for example, is zero (0) or not. If a NO answer is obtained, then the routine returns back to the initial step. Alternatively, if a YES answer is obtained meaning that the vehicle is not in motion, then the routine proceeds to step 920 wherein it is determined whether the clutch unit 5 is out of engagement or not. If a NO answer is obtained, then the routine proceeds to step 950 wherein the clutch unit 5 is released, and the routine proceeds to step 920 again. If a YES answer is obtained in step 920, then the routine proceeds to step 930 wherein it is determined whether the speed of the intermediate shaft 39 is zero (0) or not. If a NO answer is obtained, then the routine proceeds to step 960 wherein the second brake caliper 960 is turned on by the second brake actuator 70 to decrease the speed of the intermediate shaft 39 to zero, and the routine proceeds to step 930 again. If a YES answer is obtained in step 930, then the routine proceeds to step 940 wherein a gear shift to a gear ratio selected by the shifting operation in step 900 is achieved.

With the above operation of the drive line apparatus, for example, when the selector lever 15 is in the N range (i.e., the neutral position) during idle modes of engine operation, the clutch unit 5 is in engagement, and the transmission gears 31 to 37 are out of engagement with the main shaft 29. The engine power is, thus, transmitted to the intermediate shaft 39 through the clutch unit 5. When the selector lever 15 is shifted from the N range to the D range or the R range, the clutch unit 5 is, as mentioned above, brought into disengagement, so that the power transmission line from the input shaft 9 to the intermediate shaft 39 remains rotating at the same speed as that before the disengagement of the clutch unit 5. It is, therefore, necessary to hold the main shaft 29 from engaging a selected one of the transmission gear sets 31 to 37 meshing with the intermediate shaft 39 until the speed of the intermediate shaft 39 is decreased to agree with the speed of the main shaft 39. This results in an increase in shifting time. However, in the drive line apparatus of this modification, the second brake caliper 59 is turned on to decrease the speed of the intermediate shaft 39 down to zero, thereby shortening the shifting time greatly.

Figure 12:
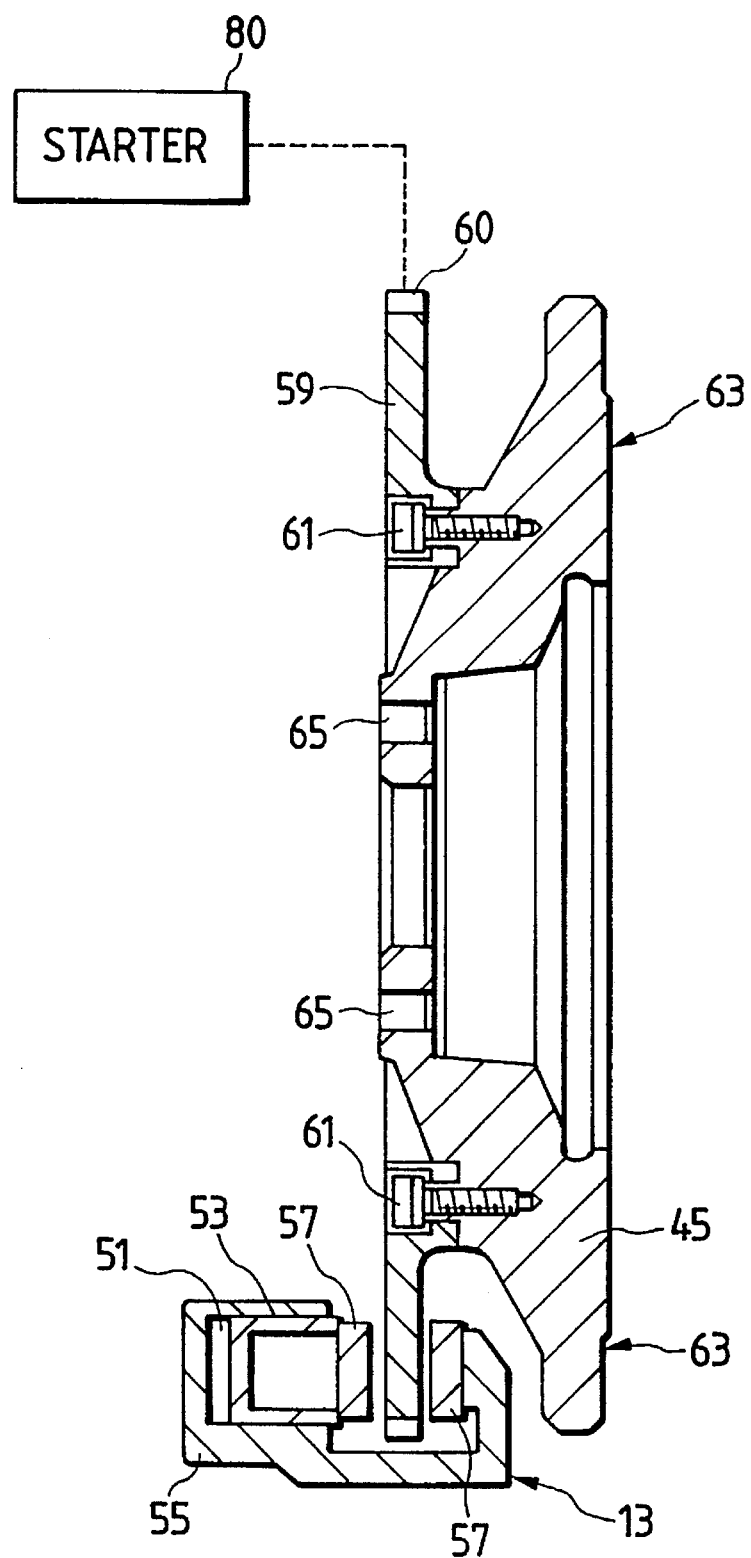
FIG. 12 is a cross sectional view which shows a first brake caliper and a flywheel of the drive line apparatus shown in FIG. 10.

The above embodiments, as already described, use the first brake caliper 13 to hold the flywheel 45 for decreasing the speed of the crankshaft 3, however, the present invention is not limited to the same. For example, a disc 59, as shown in FIG. 12, may be attached to the flywheel 45 through bolts 61 which is held by the first brake caliper 13. Additionally, gear teeth 60 which mesh with a pinion gear (not shown) of an engine starter 80 when the engine 1 is started may be formed on a circumferential surface of the disc 59 for facilitating an engine starting operation.

The clutch disc 47 is arranged in a conventional manner so as to engage a frictional surface 63 of the flywheel 45. The crankshaft 3 is attached to the flywheel 45 through mounting holes 65 using bolts.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, in the above embodiments, a gear ratio is automatically selected according to a shifting schedule stored in the gear shift map in the control unit 17, however, the benefits of the present invention may also be applied to a semi-automatic transmission which is operated manually by a driver. In this case, steps 100, 300, and 600 read a gear shift command signal (e.g., first, second, or third speed command signal) issued from the selector lever 15.

What is claimed is:

1. A drive line apparatus for an automotive vehicle comprising:

a transmission having an input shaft, an output shaft, an intermediate shaft, a transfer gear, a plurality of transmission gear sets having different gear ratios, respectively, the input shaft connecting with the intermediate shaft through the transfer gear, the output shaft selectively connecting with the intermediate shaft through engagement with a selected one of the transmission gear sets to establish a desired speed;

a clutch unit for connecting a crankshaft of an engine and the input shaft of said transmission, said clutch unit including a flywheel connected to the crankshaft and a clutch disc connected to the input shaft of said transmission;

braking means for applying a brake force to a given peripheral portion of the flywheel of said clutch unit;

first speed determining means for determining a speed of the selected one of the transmission gear sets of said transmission;

second speed determining means for determining a speed of the output shaft of said transmission; and controlling means for controlling operations of said clutch unit and said braking means, when a gear shift is performed to achieve the engagement with the selected one of the transmission gear sets to establish the desired speed of the output shaft, said controlling means bringing said clutch unit into a given degree of engagement and activating said braking means to modify the speed of the flywheel so as to establish synchronization of rotation of the selected one of the transmission gear sets with rotation of the output shaft based on the speeds determined by said first and second speed determining means.

2. A drive line apparatus as set forth in claim 1, wherein said controlling means determines a synchronization speed of the selected one of the transmission gear sets and the output shaft based on the gear ratio of the selected one of the transmission gear sets and the speed of the output shaft determined by said second speed determining means, and controls the operation of said braking means based on a difference between the synchronization speed and the speed determined by said first speed determining means.

3. A drive line apparatus as set forth in claim 1, further comprising intake air controlling means for controlling the amount of intake air introduced into the engine to modify speed of the engine when the gear shift is performed.

4. A drive line apparatus as set forth in claim 1, further comprising second braking means for decreasing speed of the intermediate shaft of said transmission when the intermediate shaft rotates upon the gear shift.

5. A drive line apparatus as set forth in claim 4, wherein said controlling means activates said second braking means to decrease the speed of the intermediate shaft to zero when a gear shift operation of said transmission is required while the vehicle is parked.

6. A drive line apparatus as set forth in claim 1, further comprising a disc having formed thereon gear teeth engaging an engine starter mounted on the vehicle, attached to the flywheel of said clutch unit, said braking means applying the braking force to a given peripheral portion of said disc.

7. A drive line apparatus for an automotive vehicle comprising:

a transmission having an input shaft, an output shaft, an intermediate shaft, a transfer gear, a plurality of transmission gear sets having different gear ratios, respectively, the input shaft connecting with the intermediate shaft through the transfer gear, the output shaft selectively connecting with the intermediate shaft through engagement with a selected one of the transmission gear sets to establish a desired speed;

a clutch unit for connecting a crankshaft of an engine and the input shaft of said transmission, said clutch unit including a flywheel connected to the crankshaft and a clutch disc connected to the input shaft of said transmission;

braking means for applying a brake force to a given peripheral portion of the flywheel of said clutch unit;

first speed determining means for determining a speed of the crankshaft;

second speed determining means for determining a speed of the input shaft of said transmission; and controlling means for controlling operations of said clutch unit and said braking means, when a gear shift is performed to achieve the engagement with the selected one of the transmission gear sets to establish the desired speed of the output shaft, said controlling means bringing said clutch unit into a given degree of engagement and activating said braking means to modify the speed of the flywheel so as to establish synchronization of rotation of the crankshaft with rotation of the input shaft of said transmission based on the speeds determined by said first and second speed determining means.

8. A drive line apparatus as set forth in claim 7, wherein said controlling means determines a synchronization speed of the crankshaft and the input shaft of said transmission based on the gear ratio of the selected one of the transmission gear sets and the speed determined by said second speed determining means, and controls the operation of said braking means based on a difference between the synchronization speed and the speed determined by said first speed determining means.

9. A drive line apparatus as set forth in claim 8, wherein said controlling means controls a degree of engagement of said clutch unit based on the difference between the synchronization speed and the speed determined by said first speed determining means.

10. A drive line apparatus as set forth in claim 7, further comprising intake air controlling means for controlling the amount of intake air introduced into the engine to modify speed of the engine when the gear shift is performed.

11. A drive line apparatus as set forth in claim 7, further comprising second braking means for decreasing speed of the intermediate shaft of said transmission when the intermediate shaft rotates upon the gear shift.

12. A drive line apparatus as set forth in claim 11, wherein said controlling means activates said second braking means to decrease the speed of the intermediate shaft to zero when a gear shift operation of said transmission is required while the vehicle is parked.

13. A drive line apparatus as set forth in claim 7, further comprising a disc having formed thereon gear teeth engaging an engine starter mounted on the vehicle, attached to the flywheel of said clutch unit, said braking means applying the braking force to a given peripheral portion of said disc.

* * * * *